UNITED STATES PATENT OFFICE 2,503,956

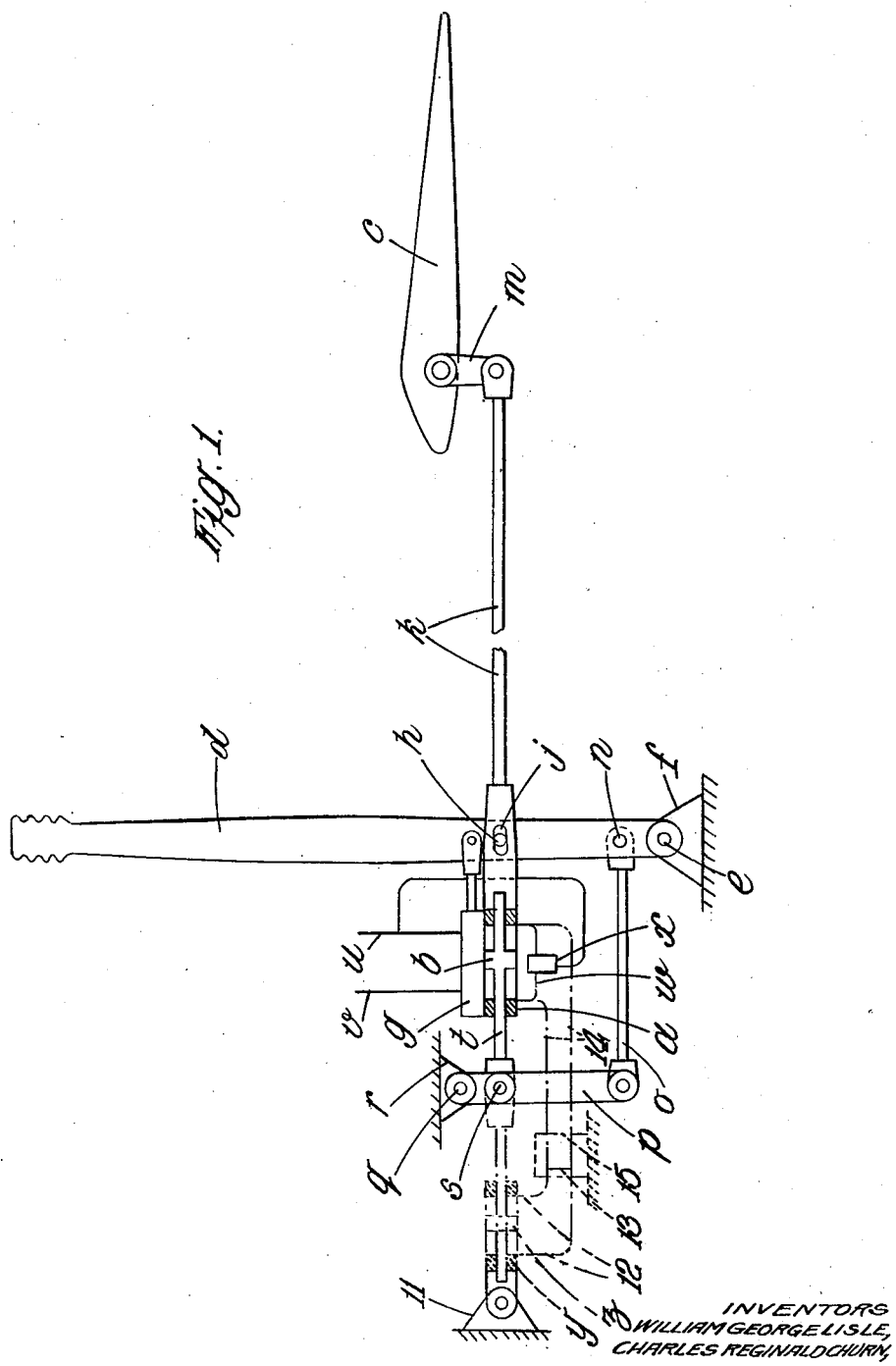

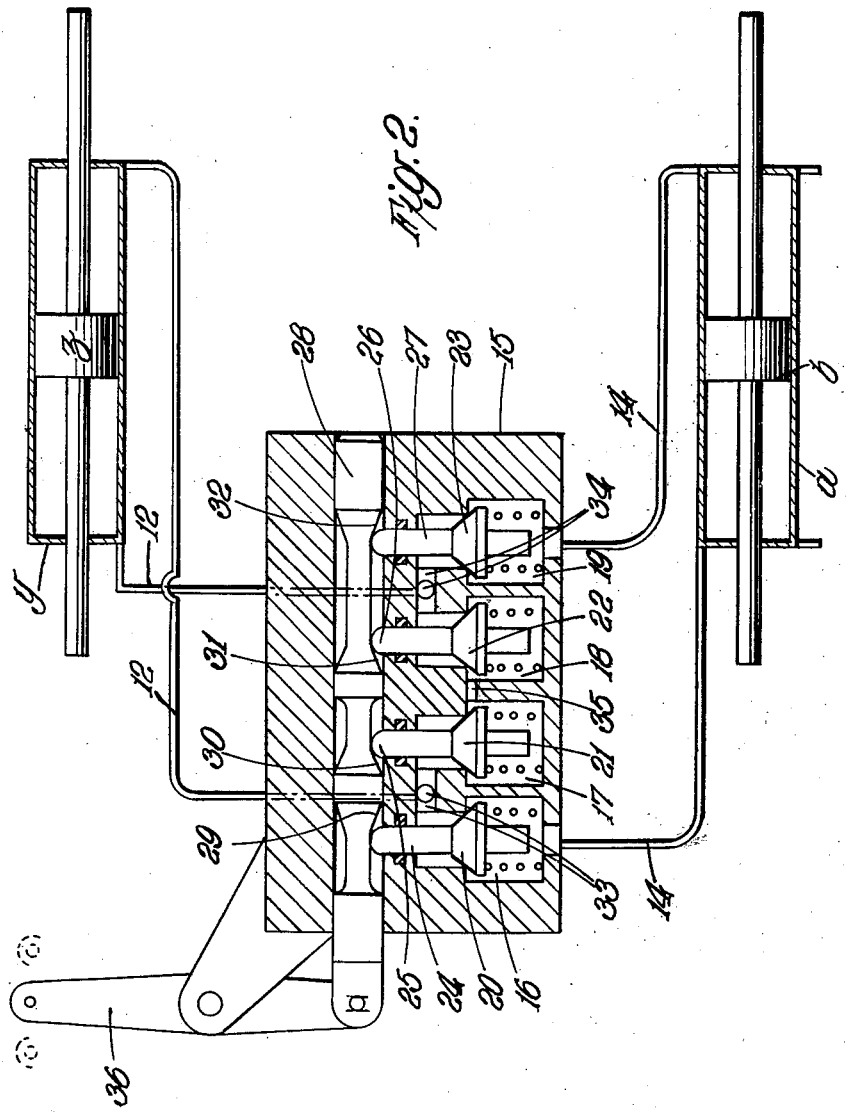

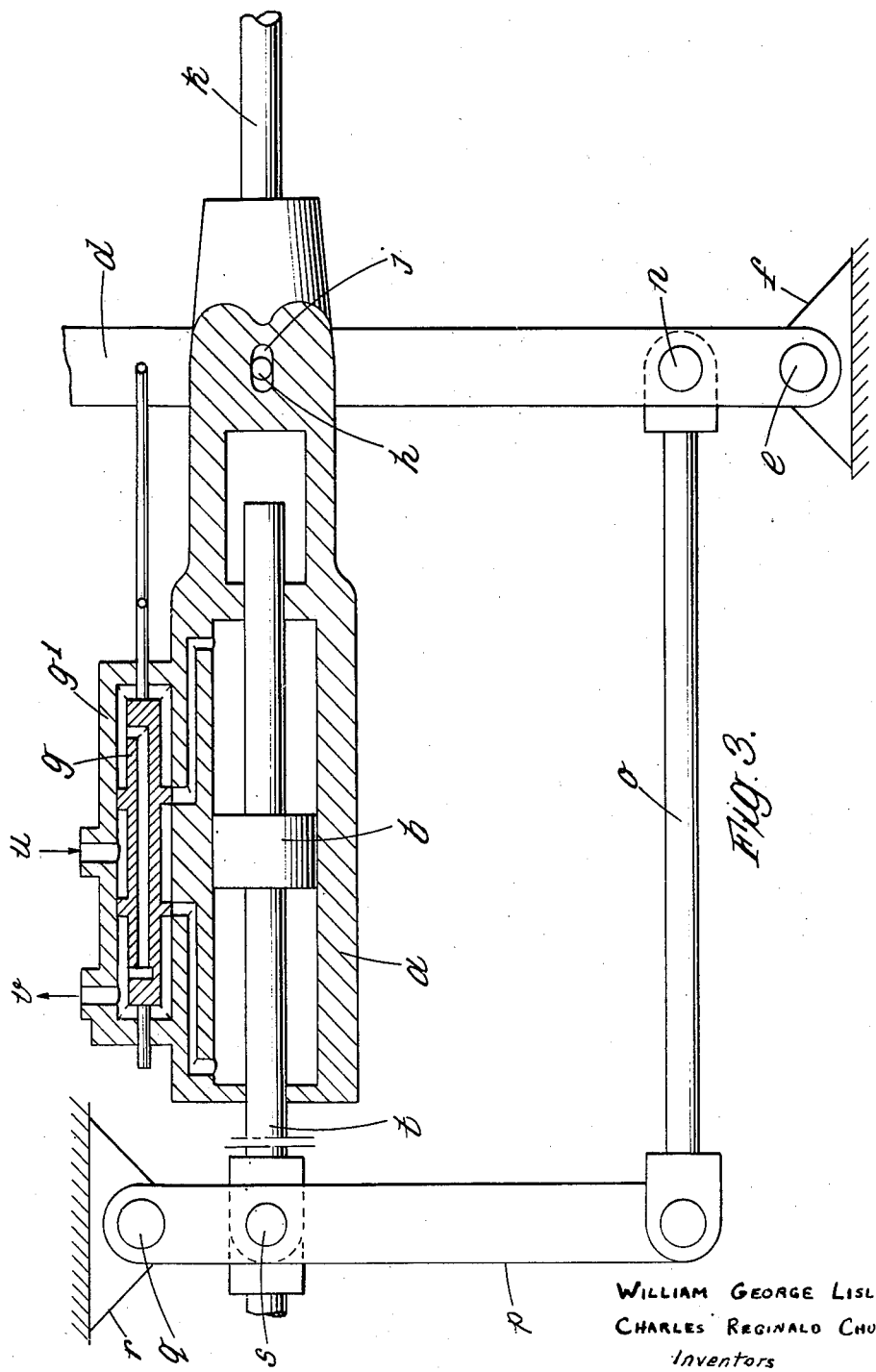

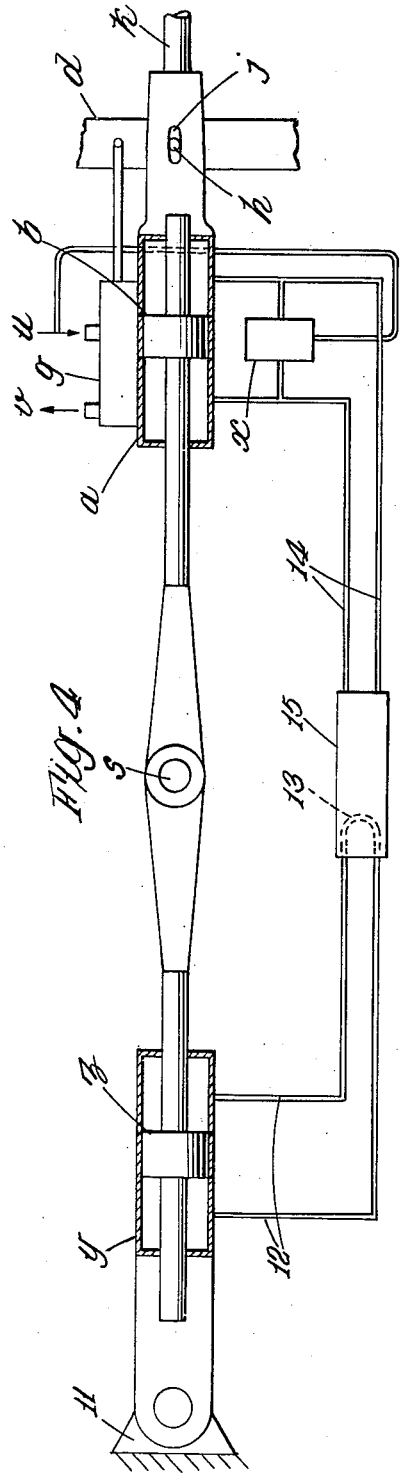
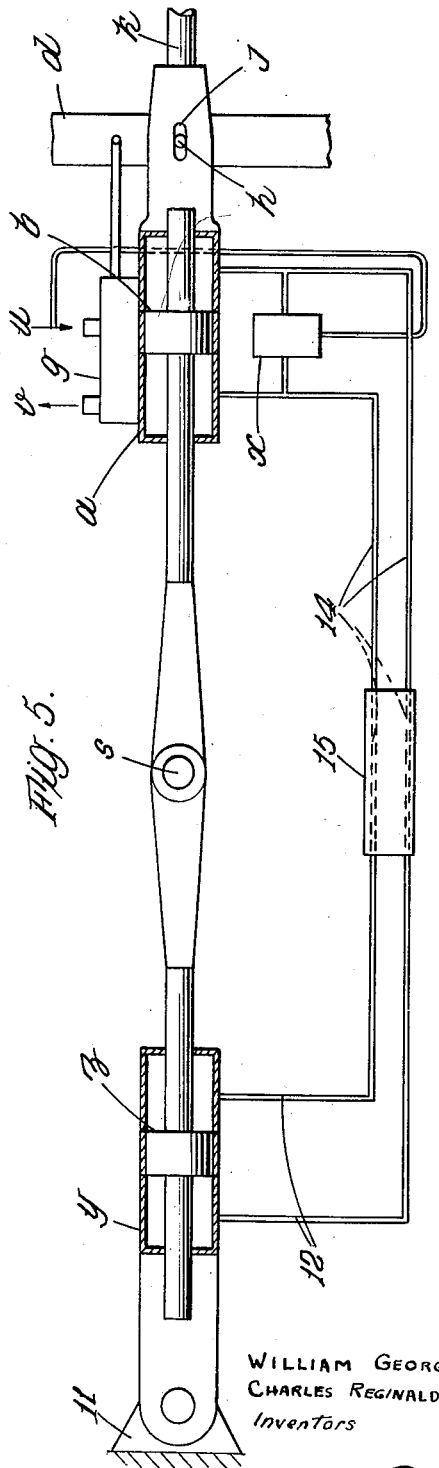

PRESSURE FLUID SERVOMOTOR HAVING FEEL MEANS

William George Lisle, East Bedfont, and Charles Reginald Churn, Tilehurst, England, assignors to The Fairey Aviation Company Limited, Hayes, England Application November 12, 1946, Serial No. 709,240
In Great Britain January 11, 1944

3 Claims. (Cl. 121—41)

It is known that there are physical limitations to the practical application of manually operated control systems to aircraft, beyond which it becomes necessary to utilise some external force to provide the motive effort, e. g., hydraulic or pneumatic power. In an orthodox hydraulic control system the manual control is applied to a valve which serves to admit fluid pressure through appropriate passages to an hydraulic power jack, servo-motor, or the like to obtain movement in the required sense. Usually, the manual force necessary to operate this valve is quite small, is reasonably constant throughout all flying conditions, and constitutes the pilot's total effort to move the control surface into any position under all circumstances, whereas in a manually operated flying control system, the pilot's effort, at any given aircraft speed, must increase as deflection of the control surface is increased, and at any given control surface deflection, must increase as the speed of the aircraft increases. Hence, a pilot of a manually controlled aircraft becomes accustomed to these force characteristics, by which he judges his control movements throughout flight, and any absense of this so-called "feel" would be disconcerting and in some circumstances might even be dangerous in manoeuvre. Another disadvantage of the orthodox arrangement is that if the fluid pressure system be so damaged as to render it inoperative the pilot is unable to control his aircraft.

It has been proposed that a control column of an aircraft should be connected with the valve of a fluid pressure jack, servo-motor, or the like, both members (piston and cylinder) of which are movable and that it should also be connected through lost motion means with one of said members and with a surface to be controlled thereby and through a link with the other of said members so that, normally, movement of the control column acts on the fluid pressure valve to bring about actuation of the control surface and to a very small extent on said other movable member, whilst, in the event of failure of the fluid pressure system, the control column will act directly, after predetermined lost motion, on the control surface.

The object of the present invention is to provide improved means for actuating control surfaces of an aircraft.

An advantage to be derived from the invention is that the orthodox trimming tab and gear may be eliminated with consequent simplification and improved control characteristics.

To this end and in accordance with the invention the control column of an aircraft is connected with the valve of a fluid pressure jack, servo-motor, or the like, both members of which (e. g. piston and cylinder) are movable, and is also connected, through lost motion means, with one of said members and with the surface to be controlled thereby and, through a movement reducing system of levers, of which the control column forms part with the other of said members, so that, normally, movement of said control column acts on the fluid pressure valve to bring about actuation of the control surface and also acts to a very small extent on said other movable member, whilst, in the event of failure of the fluid pressure system, the control column will act directly after predetermined lost motion, on the control surface.

The movement reducing system of levers (which may be made adjustable to alter the effective leverage to suit requirements) consists of the control column which is arranged to function as a lever of the second order, and one or more levers of the second order, all said levers being interconnected so that the work output from the first lever acts as the power input to the second lever, and so on, the leverages being proportioned so that the movement necessary for the power input is great as compared with the movement of the work output.

One form of the invention is illustrated, by way of example in Figure 1 of the accompanying drawings which is a diagrammatic side view of the control column and a control surface of an aircraft, together with an hydraulic servo-motor and its valve arrangements; Figure 2 is an enlarged, partly diagrammatic, sectional elevation of an optional valve control; Figure 3 is an enlarged sectional view of the hydraulic jack and its valve arrangements; and Figures 4 and 5 are enlarged diagrammatic views illustrating two different fluid connections established by the optional valve control of Figure 2.

As shown in Figures 1 and 3, both the cylinder $a$ and the piston $b$ of an hydraulic servo-motor by which a control surface $c$ of an aircraft is to be actuated are movable. The control column $d$ of the aircraft is pivoted, at its lower end, at $e$, to a fixed part $f$ of the aircraft. At points intermediate of its length, it is connected directly with the valve $g$ (shown generally as $g$ Figure 1) of the hydraulic servo-motor $ab$ and through a pin $h$ and slot $j$ connection with a link $k$ one end of which is attached rigidly to the cylinder $a$ of the hydraulic servo-motor and the other end of which is pivotally attached to an arm $m$ pro-